United States Patent [19]
Schulz et al.

[11] Patent Number: 6,141,104
[45] Date of Patent: *Oct. 31, 2000

[54] SYSTEM FOR DETERMINATION OF A LOCATION IN THREE DIMENSIONAL SPACE

[75] Inventors: Waldean A. Schulz; Robert Cormack, both of Boulder, Colo.

[73] Assignee: Image Guided Technologies, Inc., Boulder, Colo.

[*] Notice: This patent issued on a continued prosecution application filed under 37 CFR 1.53(d), and is subject to the twenty year patent term provisions of 35 U.S.C. 154(a)(2).

[21] Appl. No.: 09/150,345

[22] Filed: Sep. 9, 1998

Related U.S. Application Data

[60] Provisional application No. 60/058,371, Sep. 9, 1997.

[51] Int. Cl.[7] .................................................. G01B 11/14
[52] U.S. Cl. .................................................. 356/375
[58] Field of Search .................................. 356/375, 373, 356/376, 121, 152.1, 3.14, 141.4; 250/559.29, 222.1

[56] References Cited

U.S. PATENT DOCUMENTS

| | | | |
|---|---|---|---|
| 4,595,294 | 6/1986 | Ohki et al. | 356/375 |
| 5,196,900 | 3/1993 | Pettersen | 356/375 |
| 5,499,098 | 3/1996 | Ogawa | 356/375 |
| 5,502,568 | 3/1996 | Ogawa et al. | 356/375 |
| 5,640,241 | 6/1997 | Ogawa | 356/375 |

*Primary Examiner*—Hoa Q. Pham
*Attorney, Agent, or Firm*—Lowe Hauptman Gopstein Gilman & Berner

[57] ABSTRACT

An optical improvement for angular position sensors, which may be used to determine the spatial coordinates of a small source of light (or other energy) in a 3-dimensional volume. Such sensors normally include a linear photosensitive image detector such as a photodiode array or a charge-coupled device (CCD). An irregular pattern of parallel slits is described which increases the amount of light gathered while avoiding the undesirable characteristics of lens optics for this application. One optimal type of irregular pattern is the uniformly redundant array. A mathematical correlation function together with a polynomial interpolation function can determine the displacement of the image on the detector and thereby the location of the source relative to one angular dimension. Given the locations and orientations of several sensors in a 3-dimensional coordinate system and given the angles measured by each, the location of the point source can be computed.

20 Claims, 11 Drawing Sheets

SYSTEM FOR DETERMINATION OF A LOCATION IN THREE DIMENSIONAL SPACE

This application is a continuation in part of provisional patent application Ser. No. 60/058,371 filed Sep. 9, 1997.

FIELD OF THE INVENTION

This invention relates to an improvement in the optics for an electro-optical sensor, such as those that are used as part of a system that determines the location of one or more point sources of radiation, such as light, in a three-dimensional volume.

BACKGROUND OF THE INVENTION

Various methods and systems have been proposed to measure the location of a radiation source in three-dimensional space. By using one or two-dimensional measurements of the location of a source of radiation, typically measurements that have been made from multiple positions, the location of the light source in the space can be determined by calculation. One such method employs multiple angle-measuring optical sensors, each of which measures the location of the light source with respect to one of several angular dimensions. With the multiple sensors situated within a three dimensional coordinate system at known locations and orientations with respect to the coordinate system, the 3-dimensional (3-D) coordinates of the light source can be computed relative to that coordinate system. In these determinations, the light sources are assumed to be tiny with respect to the size of the volume in which they are located. They therefore have been considered to be point sources that radiate light outward over a relatively wide solid angle. In actuality, there is no such thing as a literal point source of light or other radiation. However, for mensuration purposes described herein, a very small light source in a relatively large volume of space is an adequate approximation. For brevity, these approximate point sources of radiation will hereinafter be referred to simply as point sources of radiation or light.

Many 3-D methods and systems have been described in previous literature and some have even been used in practice to determine the location of a point source of light in a three dimensional volume. Examples of such prior art are found in the following references:

H. Fuchs, J. Duran, B. Johnson, and Zvi. M. Kedem; "ACQUISITION AND MODELING OF HUMAN BODY FORM DATA", Proc. SPIE, v. 166, 1978, p 94–102.

Jean-Claude Reymond, Jean-Luc Hidalgo; "SYSTEM FOR MONITORING THE MOVEMENTS OF ONE OR MORE POINT SOURCES OF LUMINOUS RADIATION", U.S. Pat. No. 4,209,254, Jun. 24, 1980.

Y. Yamashita, N. Suzuki, M. Oshima; "THREE-DIMENSIONAL STEREOMETRIC MEASUREMENT SYSTEM USING OPTICAL SCANNERS, CYLINDRICAL LENSES, AND LINE SENSORS", Proc. SPIE, v. 361, 1983, p. 67–73.

F. Mesqui, F. Kaeser, and P. Fischer; "REAL-TIME, NON-INVASIVE RECORDING AND 3-D DISPLAY OF THE FUNCTIONAL MOVEMENTS OF AN ARBITRARY MANDIBLE POINT", SPIE Biostereometrics 602, 1985, p 77–84.

Sharon S. Welch, Kevin J. Shelton, and James I. Clemmons; "OPTICAL POSITION MEASUREMENT FOR A LARGE GAP MAGNETIC SUSPENSION SYSTEM", Proc. of the 37th International Instrumentation Symposium, San Diego, May 5–9, 1991, p. 163–182.

Waldean A. Schulz; "METHOD AND APPARATUS FOR THREE-DIMENSIONAL NON-CONTACT SHAPE SENSING", U.S. Pat. No. 5,198,877, Mar. 30, 1993.

Farhad Daghighian; "OPTICAL POSITION SENSING WITH DUOLATERAL PHOTOEFFECT DIODES", Sensors, 1994 November p. 31–39.

Robert P. Burton and Ivan E. Sutherland; "TWINKLE BOX A THREE-DIMENSIONAL COMPUTER INPUT DEVICE", AFIPS Conference Proceedings 43, 1974, Chicago, Ill.

The complete disclosures of the above H. Fuchs, Sharon S. Welch, and Robert P. Burton references are incorporated herein by reference.

Such systems typically include multiple angular location sensors. Furthermore, each angular location sensor typically includes a linear position detector, such as photo-electric position sensitive detector (PSD), a linear photodiode array, or a linear charge-coupled device (CCD). The linear position detector may be a photosensitive semiconductor strip (in the case of a PSD) or a row of many discrete photosensitive elements called pixels (in the case of a CCD or photodiode array). Area (or two-dimensional) position detectors may also be used, but the present invention is particularly useful for linear (or one-dimensional) photodiode arrays or CCDs, which detect an image. The determination of a point in space using a two dimensional detector can be considered similar to determining that position by means of two linear position detectors that are disposed at right angles to each other. Therefore, the following description will concentrate on a single linear imaging detector that uses discrete pixels. It should be noted that, while a linear detector measures only one angle (for example elevation) to the point source of radiation, an area detector measures two angles (for example, elevation and azimuth) simultaneously. However, two linear image detectors require only 2N pixels, while an area image detector has N·N' pixels, where N is the number of pixel rows and N' is the number of pixel columns. Since N and N' usually exceed 500, the area detector requires the readout, storage, and processing of at least several hundred times as many pixels.

Each angular sensor also includes an optical system to focus the radiation from the point source into a narrow lineal real image, and to cause that image to cross the linear image detector at an approximately right angle. In reference to FIG. 1 (prior art), a cylindrical lens 27 is typically employed to focus light rays 15 from a point source 10 into a linear real image 31 that crosses the photosensitive strip 16 of the linear image detector 14 at approximately a right angle.

Standard spherical lens systems in general cannot be used with a one-dimensional angular sensor for this purpose, because the focused real image of a point source 10 produced by a spherical lens is a tiny spot of light. Because this image is a spot, rather than a line, in most cases it will focus off the photosensitive strip, that is, far to one side of it. This is because, although the linear detector's row of photosensitive pixels is long, it is only a few microns wide. Therefore, a cylindrical lens 27, rather than a spherical lens, has generally been used in such optical sensors to focus the point light source 10 into a line image 31. Some tiny portion of this line image intersects the linear row of pixels at approximately a right angle no matter where the point source is located in a relative large volume. A compound cylindrical lens, consisting of several individual positive or negative focal length lenses, has sometimes been used to mitigate optical problems. However, for simplicity only a single simple cylindrical lens 27 is illustrated in FIG. 1.

As shown in FIG. 2, a simple narrow aperture or slit 22 may be employed instead of employing a cylindrical lens to produce the linear real image, in the same way that a pinhole can replace a spherical lens in a conventional camera. A single, straight, precision slit 22 focuses light from a point source 10 onto a line image 32 that approaches a perfect line image. Such a slit might be a long, very narrow rectangular aperture within an opaque mask, for example. Furthermore, unlike the cylindrical lens shown in FIG. 1, the slit 22 has an infinite depth of field. That is, except for diffraction effects, the line image 32 is in sharp focus regardless of the distance of the point source 10 relative to the linear detector. Furthermore, the image will be as straight as the slit is, and present day technology can inexpensively manufacture masks with very precise optical apertures. So, as the light source moves along a path 12 parallel to the longitudinal axis of the slit, the point of intersection of the line image 32 and the photosensitive strip 16 remains constant. Furthermore, the image remains sharp regardless of the distance (range) of light source 10 from the slit 22. Further, the angular field of view may be easily changed by varying the distance between the slit 22 and the photosensitive strip 16. As the distance decreases, the field of view increases. These are significant advantages over lens based optics.

Unfortunately, one significant drawback to the slit 22 is its limited light gathering ability. This limitation produces a dim line image 32 in comparison to the image 31 produced by a typical cylindrical lens 27. This limitation restricts the range at which any practical sensor can detect the point light source 10, because, as is well known, the amount of incident light decreases inversely with square of the increasing distance. Even at shorter ranges, where the brightness of the image is sufficient for measurement, the light focused from a single slit still presents a poor signal-to-noise ratio (SNR), which limits the reliability of the measurement. Alternatively, a knife-edge (in effect, a "one-sided slit") or a very wide slit may be substituted for the slit 22. These options generally are worse than a narrow slit, because they flood the photosensitive detector with more ambient light, which competes with the real image of the point source while providing no additional substantive position information.

A second significant drawback to the slit 22 is its susceptibility to dust, imperfections, and smudges. For example, an opaque particle within the slit but near one edge may cause a shift in the centroid of the image when the shadow of the particle falls on the linear photosensitive detector. While there are ways to detect when this problem arises, it is undesirable and affects accuracy.

In reference to both FIGS. 1 and 2, note that a typical cylindrical lens 27 is more efficient than a slit 22 in concentrating the light that passes through it and is focused onto a small area on the photosensitive row of pixels 16. This is because the lens is considerably wider, and more light enters the lens 27 than the slit 22. Yet this light is concentrated onto roughly the same area as the image formed by the slit. That is one major advantage of using a lens. Another advantage is that the lens 27 is substantially immune to the effects of a moderate amount of dust on it, unlike a single slit aperture 22.

However, the cylindrical lens 27 has at least three major drawbacks. First, the linear real image 31 that is formed by a cylindrical lens is not an ideal straight line at all. As the light source moves along a path 12 parallel to the longitudinal axis of the lens, the point of intersection of the line image 31 on the photosensitive strip 16 moves a small distance. This adversely affects the accuracy of the determination of the location of the point light source. Second, for a fixed-focus arrangement of a cylindrical lens, the point where the line image 31 meets the photosensitive strip does not maintain a sharp focus as the point source 10 moves away from the optical centerline 11. This is especially true as the distance 12 increases, because a standard cylindrical lens presents a less circular and more elliptical curvature to those light rays 15 entering the lens from an angle that is far removed from the optical centerline of the camera. The result is an aberated real image 31 which is in poor focus. As the image becomes blurred, the location of the centroid of image is determined with less certainty (especially for a CCD with pixels that individually have diminished intensity). A third disadvantage of the lens 21 is that the sharpness of focus will be affected by the distance of point source 10 from the lens 21, especially for wider lenses that collect more light. This is the same depth-of-field effect as for standard spherical lenses with larger apertures.

These disadvantages limit the accuracy of measurement. Multiple lenses and light stops can improve the image characteristics, but such improvements are more costly, involve more difficult manufacturing, and still do not solve the problems well enough for high accuracy measurement. The nonlinear distortion can be modeled and corrected in the computation that calculates the three-dimensional location of the light source from the angle measurements provided by the multiple sensors. However, this correction is complex and in practice resorts to approximations. This is because the lens distortion correction for any one sensor cannot be made using only the data from itself alone. The correction depends on knowing both the azimuth and elevation angles of incidence of the light with respect to the cylindrical lens, but each sensor measures only one angle with respect to its own lens axis. While a slit as a replacement for the cylindrical lens does avoid the above problems, its limited light gathering ability, limited range, and its susceptibility to dust, smudges, and imperfections are major drawbacks. Therefore, there is a need for an optical system that captures the advantages of both slits and cylindrical lenses while it avoids their disadvantages.

Multiple apertures have been used in the prior art, but for different purposes than those of the instant invention. In the prior art, coded apertures (a patterned form of multiple apertures) have been used exclusively with area arrays, such as in connection with the area CCDs that are used in video cameras. The application of such coded apertures has previously been oriented toward the capture and reconstruction of complex two-dimensional images for visualization purposes. They have not been used to improve the precision of one dimensional sub-pixel location measurements. Historically, coded apertures have been used to collect more of the available radiation in X-ray imaging, because weaker sources of radiation are desirable from the patient's health perspective, and because conventional lenses cannot be used to focus X-rays. Coded apertures have also been used in connection with two-dimensional astronomical imaging, in which the sources of light are extremely dim. In the prior art, the apertures that were used for these purposes were usually plural pinholes arranged in a pseudo-random, two-dimensional array.

The following references are cited as examples of the state of the prior art being referred to above:

Kevin Byard; "SYNTHESIS OF BINARY ARRAYS WITH PERFECT CORRELATION PROPERTIES CODED APERTURE IMAGING", *Nuclear Instruments and Methods in Physics Research* A336, 1993, p. 262–268.

Kevin Byard; "AN OPTIMISED CODED APERTURE IMAGING SYSTEM", *Nuclear Instruments and Method in Physics Research* A313, 1992, p. 283–289.

Walter C Chiou and Richard C Augeri; "SQUARE ANTI-SYMMETRIC UNIFORMLY REDUNDANT ARRAY CODED APERTURE IMAGING SYSTEM", U.S. Pat. No. 5,606,165, Feb. 25, 1997.

E. E. Fenimore; "CODED APERTURE IMAGING: PREDICTED PERFORMANCE OF UNIFORMLY REDUNDANT ARRAYS", *Applied Optics* 17, 22, 1978, p. 3562–3570.

E. E. Fenimore and T. M. Cannon; "CODED APERTURE IMAGING WITH UNIFORMLY REDUNDANT ARRAYS, *Applied Optics* 17.3, Feb. 1, 1978, p. 337–347.

Ronald J. Geluk; "SYNTHETIC APERTURE SCANNER FOR DECODING A CODE IMAGE PRODUCED BY PENETRATING RADIATION, SUCH AS X-RAYS", U.S. Pat. No. 4,191,890, Mar. 4, 1980.

Stephen R. Gottesman and Edward J. Schneid; "PSEUDO-NOISE PRODUCT CODED APERTURE ARRAYS AND METHOD FOR DESIGNING SAME", U.S. Pat. No. 5,036,546, Jul. 30, 1991.

S. R. Gottesman and E. J. Schneid; "PNP—A NEW CLASS OF CODED APERTURE ARRAYS", *IEEE Transactions on Nuclear Science* 33.1, 1986 February, p. 745–749.

Philippe Laudet and Jean-Pierre Roques; "RESOLUTION OF STRONG SOURCES FOR A GAMMA-RAY TELESCOPE USING CODED APERTURE IMAGING", *Applied Optics* 27:20, Oct. 15, 1988 p. 4226–4230.

Masaru Matsuoka and Yoshili Kohmura; "A NEW CONCEPT OF X-RAY MICROSCOPES WITH A CODED APERTURE IMAGING MASK", *Jpn. J. Appl. Phys.* 34*Jpn. J. Appl. Phys.* 34:1:1, p. 372–373.

Jean in 't Zand; "CODED APERTURE CAMERA IMAGING CONCEPT", Internet WWW site http://lheawww.gsfc.nasa.gov/docs/cai/coded_intr.html, Oct. 7, 1997.

Included in some of the above references is the description of a particular form of coded aperture called a uniformly redundant array (URA). While the references employ two-dimensional URAs for imaging purposes, the present invention uses one-dimensional URAs specifically for angular position sensors. URAs have particular properties, which improve the results of applying a mathematical correlation to the image in order to determine its exact location. Unlike many arbitrary aperture patterns, which may generate multiple local peaks in the correlation, URAs generate a single, clear-cut peak, which corresponds directly to the location (displacement) of the image on the image detector.

OBJECTIVES AND SUMMARY OF THE INVENTION

An objective of the present invention is to provide an optical apparatus which uses light from a point source to create a nearly ideal image with negligible distortion, such that the lateral displacement of the image on the imaging photosensitive detector will be directly proportional to the tangent of the angle of the incoming light rays.

Another objective of this invention is to provide an apparatus that creates an image that is in sharp focus regardless of the distance of the point light source or its angle with respect to the optical apparatus.

A further objective of this invention is to provide a linear image at least ten times the luminosity than that obtained from a single simple slit while decreasing the relative effects of noise or artifacts of the system.

Another objective of this invention is to mitigate the effects of minor defects, dust, smudges, and fingerprints on the optics of the detector.

A still further objective of this invention is to provide a design for the optical apparatus of this invention that minimizes manufacturing complexity and yet improves the performance/cost ratio.

Still another objective of this invention is to increase the amount of location information contained in the image, such as the provision of redundant data.

A further objective of this invention is to decrease the effects of non-uniformity of responsiveness among the photosensitive elements (pixels) of the detector.

Other and additional objects of this invention will become apparent from a consideration of this specification, including the drawing hereof, as well as the claims appended hereto.

Satisfying some or all these objectives will directly enhance the measurement accuracy and reliability of individual optical sensors, and therefore the accuracy of a whole three-dimensional system employing them will be improved.

The invention described herein provides an improvement in the optics used in conjunction with an electro-optical linear image detector. Together, these constitute a sensor that measures the one-dimensional angular location of a light source. This improvement is also intended to be applied to the individual sensors of more complex, multi-sensor systems. These more complex systems may employ several such sensors to measure the angular location of a point light source from several locations and from these data to calculate the coordinates of the light source within a three-dimensional coordinate system. Simpler versions of the apparatus of this instant invention are adapted to make measurements within a one- or two-dimensional coordinate system. Furthermore, versions of the apparatus of this invention might employ multiple light sources attached to a rigid body so the location and orientation of the body as a whole might be determined.

To achieve these and other features, the invention provides an improved optical apparatus for receiving radiation, preferably light or electromagnetic radiation, from a point radiation source and determining the angular location of the source about an axis of the apparatus. The apparatus comprises a linear imaging detector that itself comprises an array of many light sensitive elements (pixels) that are adapted to detect an image. A typical example of commercial linear CCD detector with several thousand pixels is the Kodak KLI-5001. Another example of a suitable commercial detector is an EG&G Reticon RL4096, which comprises a linear array comprising a row of several thousand sequentially addressable photodiodes. The sensor to which this invention is applied, and with which it is used, may be identical to those that are known in the prior art, or the sensor may be one that is not yet in the prior art or not yet commercially available, such as linear CMOS (complementary metal oxide silicon) photodiode arrays. It is the means of bringing the radiation to the sensor and extracting data from it, and not the sensor itself, which constitutes this invention.

The improved system of this invention comprises at least one point source of electromagnetic radiation and a receiver of such radiation, where there is interposed between the source and the receiver a plurality of narrow, parallel slits preferably of various widths, where the slits are spaced apart in an irregular pattern. The slits should be wide enough and spaced far enough apart that diffractive effects are minimized. (Diffractive effects are undesirable, because the diffraction patterns are not stable with respect to changing source locations.) These slits may be literal openings through a self-supporting opaque material, or they may be substantially transparent narrow elongated rectangular windows within a substantially opaque mask that is disposed on a transparent substrate. Light from the point source is passed through the slit pattern in such manner as to cast a similar pattern of undistorted linear real images of the slits onto the detector. The axis of the detector is arranged to be substantially perpendicular to the lines of the image. The total luminosity of the pattern is proportional to the cumulative width of the slits. While regularly spaced slits could be used, they present a possible ambiguity when one or more of the image lines at an end of the pattern are eclipsed. It is difficult, if not impossible to determine which end of the pattern is missing. Therefore, a non-repeating or pseudo-random pattern of slits is preferred.

In a preferred embodiment of this invention there are at least about ten (10) slits, and the cumulative width of the slits is at least ten (10) times the width of a simple single slit as has been used in the prior art. This apparatus exhibits distortion and depth of field comparable to those of a single slit, which are improved over that of a cylindrical lens system. This improvement is particularly evident where the incident light is at more oblique angles. Yet, for certain designs, the total luminosity of the instant system could approach that of a cylindrical lens with baffles.

Furthermore, there is an unexpected advantage of employing multiple narrow slits in comparison to either a cylindrical lens or a single slit of any width. When precisely interpolating the fractional-pixel location of the image on the detector, the most significant location information is embodied in the edges of the image line of each slit. Therefore, a plurality of slits contains multiples of the displacement information, much more redundant information than is available from a simple image formed by a single lens or a single slit.

In order to recover this extra image location information, much more computation is required than with either a lens or a single slit. Nevertheless, this engineering trade-off will be acceptable in general, because of the speed of electronic computing processors, which is increasing each year, and even at a decreasing cost. At present, the cost of a digital signal processor generally is far less than the cost of a precision multiple-lens optical system, and it is reasonable to expect this cost disparity to continue.

Because the slit pattern forms a complex image on the detector, it is preferred to use an imaging detector that has a very large number of discrete pixels (such as a CCD or a CMOS photodiode array). The more pixels that are in the detector, the greater will be the accuracy of the resultant determination, although at some point the price increases sharply. It is contemplated that detectors with several thousands of pixels will be suitable for this invention. A position sensitive device (PSD), which only detects the location of the centroid of the radiation impinging on it, is poorly suited to use in the practice of this invention, because it would not capture the redundant information coded into the complexity of the pattern.

The electromagnetic radiation being discerned according to this invention may be in the form of a broad spectrum of wavelengths, such as visible light. It need not be coherent or monochromatic. Alternatively, narrow spectra wavelengths of radiation can be used to advantage. One means of producing such a narrow radiation wavelength band is to employ an optical filter that passes only a narrow range of wavelengths which are matched to the wavelength of a nearly monochromatic light source. Such embodiment of this invention generally can decrease the interference effects of ambient background illumination comprising a broad spectrum of wavelengths. In this embodiment, the filter can be the substrate for the aperture mask itself. Presumably the wavelength of the light source would itself be matched with the wavelength at which the detector itself exhibits best performance. For modern, typical CCDs this wavelength might be in the range of the near-visible infrared wavelengths. Alternatively, there may be other, perhaps practical, reasons for using a wavelength of light that is visible to human eyes. In any case, as new detectors are perfected, different wavelengths of light may become more desirable. For larger scale applications, the techniques of this invention might employ other types of radiation, such as for example: sound waves or radio waves, using appropriate slits with aperture masks made of appropriate materials opaque to the type of radiation used.

BRIEF DESCRIPTION OF THE DRAWING

The accompanying figures illustrate prior art as well as a preferred embodiment of the present invention and thereby form a part of the specification. Together with the textual description, these figures serve to explain the advantages and principles of the invention. Each reference number in the figures consistently refers to the same component of the invented apparatus throughout all the figures as well as in the textual description.

FIGS. 1 through 4 include a number of common components. One is a point source of light 10, illustrated by a tiny infrared light-emitting diode (LED). Another common component is a linear photosensitive image detector 14 that is conventionally used to detect the real image (such as 31 in FIG. 1) of the point light source focused onto a row of many photosensitive pixels 16. The light source 10 generally will be at an oblique angle with respect to the image detector 14 and the optical centerline 11. In FIGS. 1 through 3 the location of the light source 10 is depicted by a lateral offset distance 13 of the light source 10 from the optical centerline 11 and by an elevation distance 12 of the light source 10 above the optical centerline 11.

FIGS. 1 and 2 illustrate arrangements that represent the state of the prior art. FIG. 1 is a perspective view illustrating the conventional use of a cylindrical lens 21 or lens system to focus the light rays 15 from a point light source 10 into a linear real image 31, which is made to cross the photosensitive strip 16 of a linear image detector 14. FIG. 2 is a perspective view illustrating the use of a single straight slit 22 to cast the light 15 from a point source 10 into a linear image 32 that is made to cross the strip 16 of a linear image detector 14.

FIG. 3 is a perspective view of an arrangement of the apparatus of the present invention. It illustrates the use of an irregular pattern of multiple parallel slits 25 to convert the light 15 from a point source 10 into a pattern 35 of linear images that are made to cross the strip 16 of a linear image detector 14.

FIG. 4 is a plan view of an arrangement of the apparatus of the present invention that has been shown in perspective in FIG. 3. The light rays 15 are shown to flow through the irregularly spaced slits 25 to be converted to a corresponding congruent image pattern 35 on the photosensitive strip 16 of the linear image detector 14.

FIG. 5 depicts an enlargement of a symmetrical, but otherwise irregular, pattern of slits, which is in fact an URA. In this figure, the black areas are intended to be the apertures, and the white areas opaque mask. (However, the negative of this could also work as a URA.)

FIG. 6a is a graph of the mathematical representation of a specific pattern of apertures according to this invention. In this case, it is an URA based on the prime number N=97. A 1 represents an aperture, and a 0 represents an opaque area. FIG. 6b is a graph of the mathematical representation of the corresponding reference pattern. Here, a 1 represents where we expect to see image of radiation passing through the corresponding slit. A −1 represents where we expect to see the shadow of an opaque area. FIG. 6c is the graph of a realistic, actual image pattern, which includes thermal noise and some diffraction artifacts. FIG. 6d is a graph of the correlation between the image and reference patterns as the reference pattern is shifted left or right from the peak displacement. The horizontal scale of FIG. 6d is the displacement of the reference pattern (FIG. 6b) relative to the displacement of the actual image pattern on the detector.

FIG. 7 is a graphical presentation of data that shows a typical mathematical correlation function 42 where the horizontal axis is the displacement (in pixels) of the image pattern 35 on the image detector 14, and the vertical axis is the correlation function value (the relative degree of match). It also shows a continuous best-fit quadratic function 44 with a peak 46, which estimates the sub-pixel displacement of the image pattern. The horizontal scale is the absolute displacement of the reference pattern in terms of the pixels of the image detector.

FIG. 8a is a graph corresponding to the graph of FIG. 6a, but with missing apertures. This simulates a CCD with "dead" pixels or an URA with blocked apertures (because of dust or defects, for example). FIG. 8b is a graph corresponding to the graph of FIG. 6d showing the correlation of the defective aperture pattern of FIG. 8a with the reference pattern of FIG. 6b. This demonstrates the immunity of the URA to anomalous local defects.

FIG. 9 is a graph showing the height of the peak of the correlation function as the size (scale) of the image pattern changes by a few percent, but the reference pattern remains the same size.

FIG. 10 summarizes the calculations to compute angular location of the source with respect to each sensor and to compute the XYZ location of the source assuming that there are a sufficient number of sensors at appropriate locations.

Figure 1:
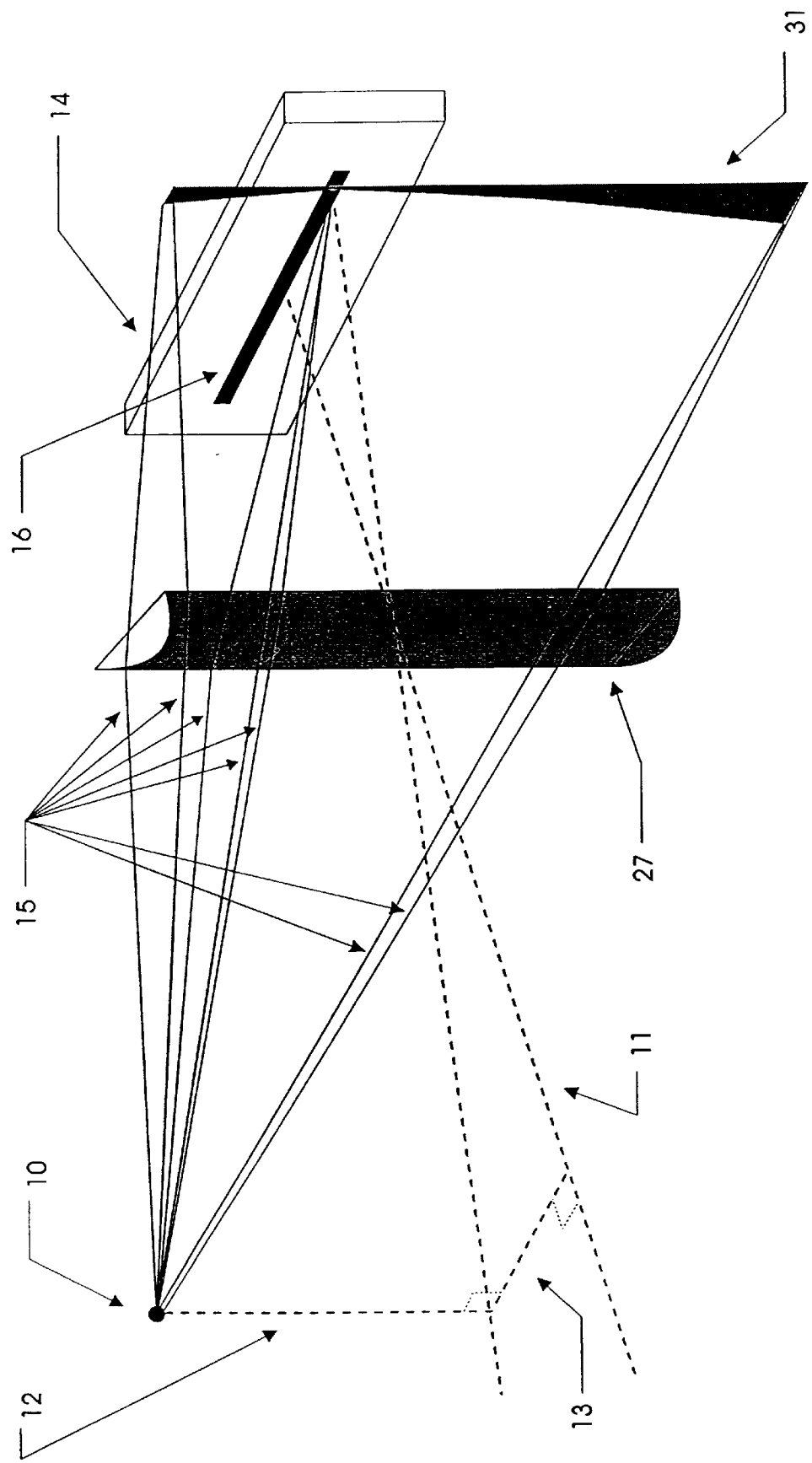
FIG. 1 is a perspective schematic view of a lens imaging sensor of the prior art.
Figure 2:
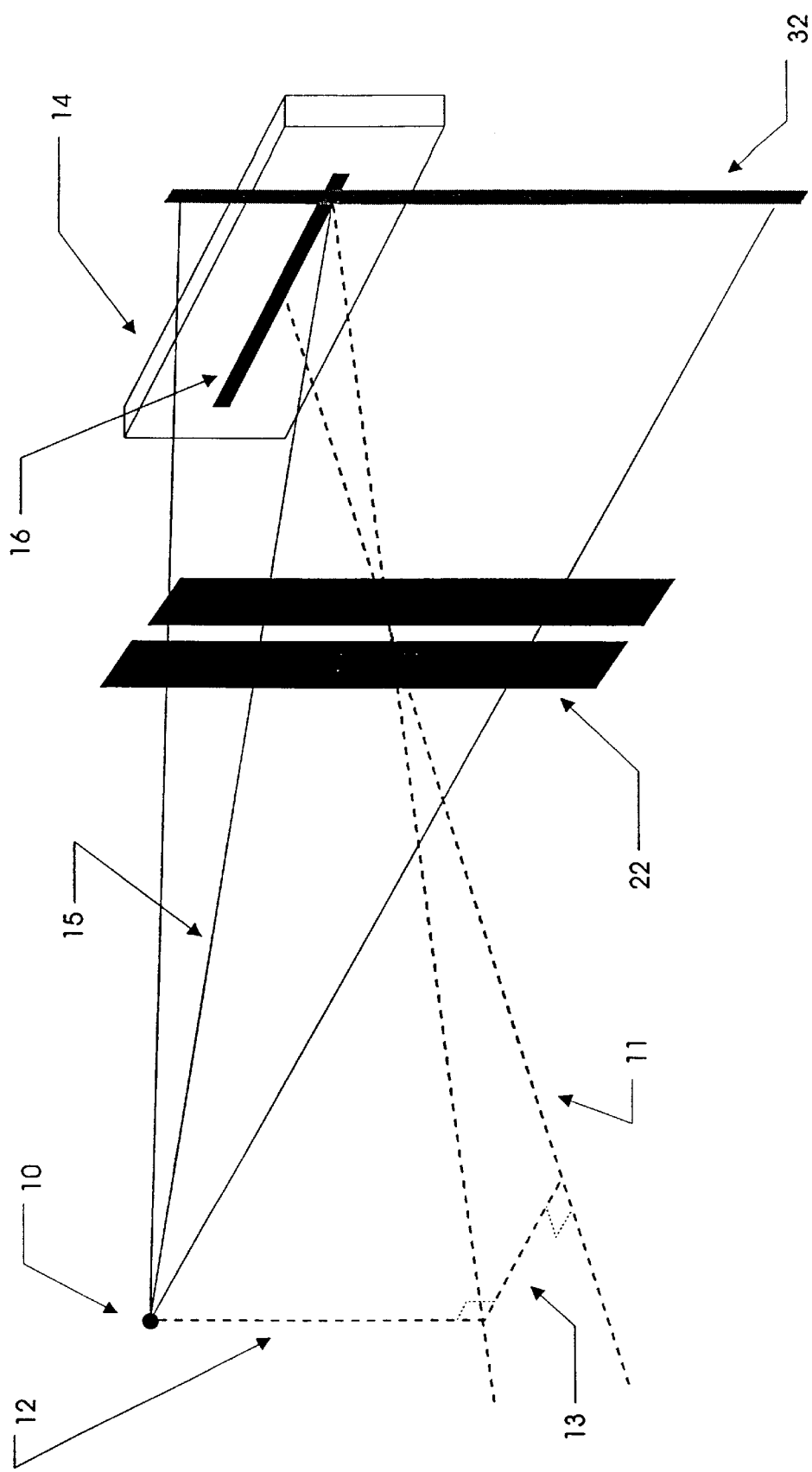
FIG. 2 is a perspective schematic view of a slit imaging sensor of the prior art.

The parts in the various figures are numbered throughout as follows:

10 point source of light
11 optical centerline
12 elevation distance of light source above centerline
13 lateral offset distance of light source from centerline
14 photosensitive image detector (photodetector)
15 ray(s) of light as they pass from the point source to the photodetector
16 row of photosensitive pixels
27 cylindrical lens
22 straight slit
25 irregular slit pattern
28 multiple parallel irregularly-spaced slits
31 real image of a point source through cylindrical lens
32 real image of a point source through a single slit
35 real image of a point source through irregular slit pattern
42 correlation between actual and reference images for various displacements
44 best-fit interpolation function (such as a quadratic polynomial)
46 peak value of best-fit interpolation function

DETAILED DESCRIPTION OF A SPECIFIC EMBODIMENT

Figure 3:
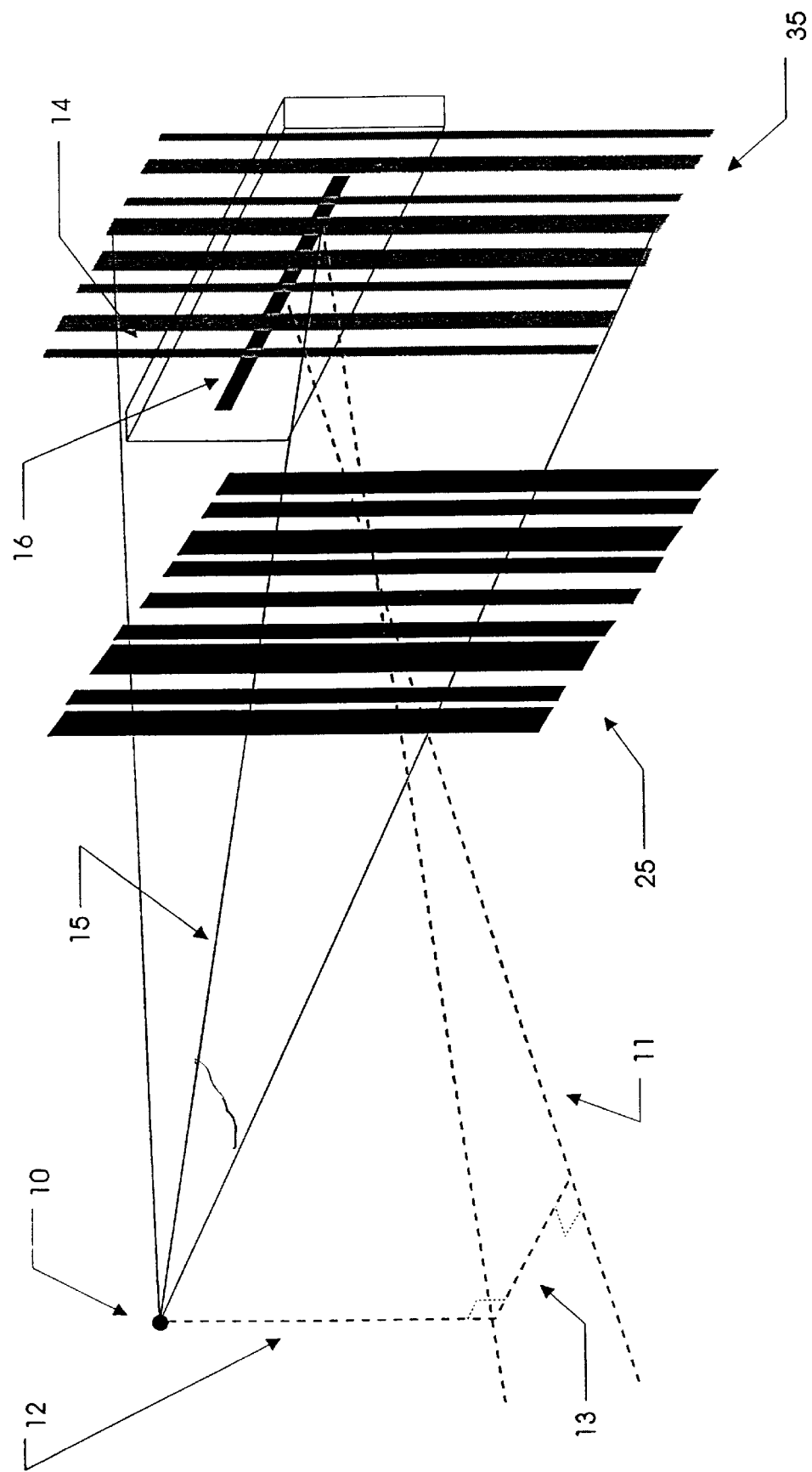
FIG. 3 is a perspective schematic view of a slit imaging sensor according to this invention.
Figure 4:
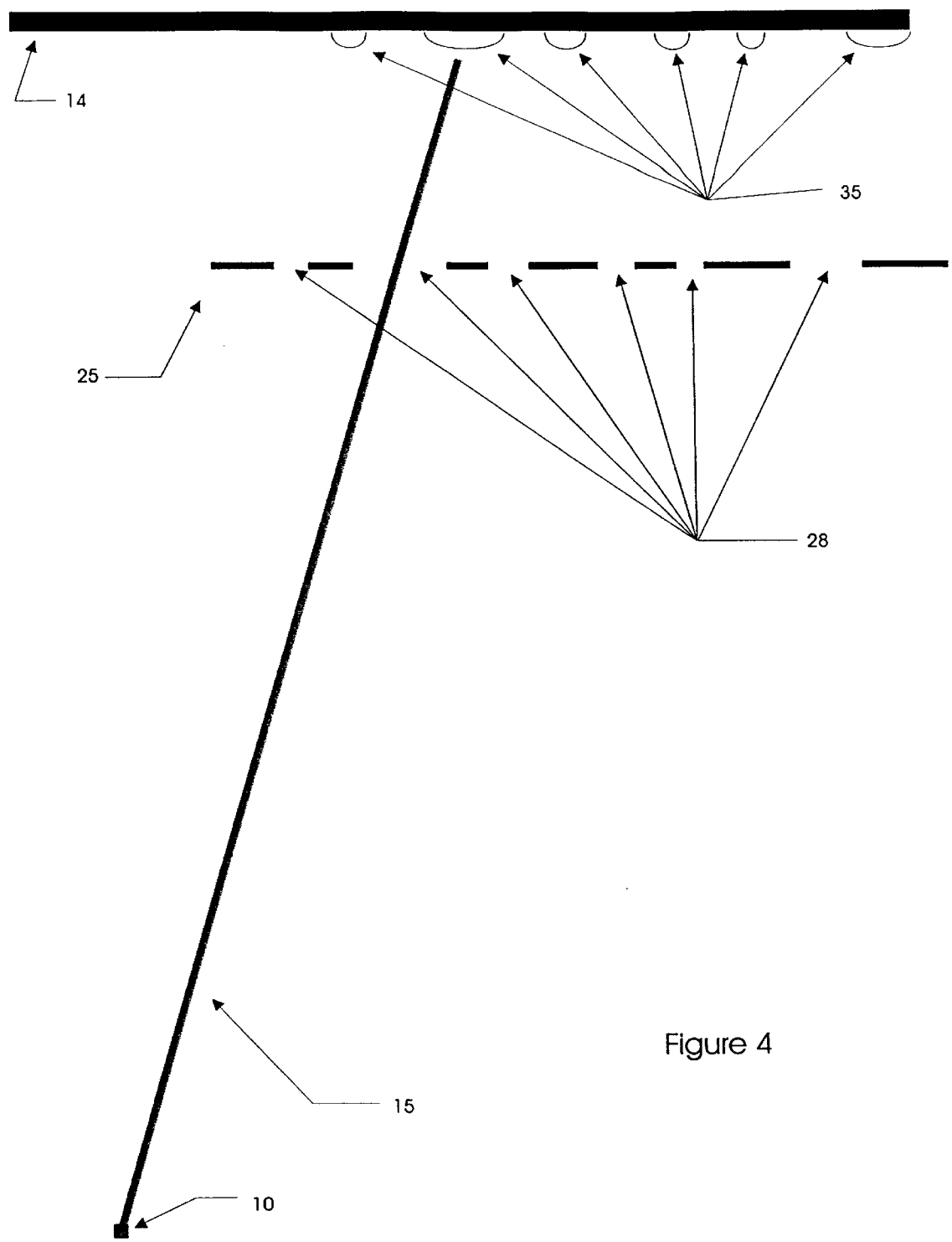
FIG. 4 is a plan schematic view of the operation of the plural slit imaging sensor of this invention.

The invention will be described below with reference to the Figures and the numbered individual components therein. In the description below, the specific construction, the count, and the arrangement of the components are intended for clarity of illustration. Other, and perhaps even better, arrangements of the components constitute alternative specific embodiments of the same method and apparatus. FIGS. 3 and 4 illustrate this invention in the use of an irregular pattern 25 of multiple straight and parallel slits 28 to convert the light from a substantial point source 10 into an image pattern 35, which is caused to cross the photosensitive image detector 14. This invention operates somewhat differently than prior art, in that the prior art used a converging cylindrical lens. Instead of gathering and focusing more light intensity onto the same line image location on the photosensitive strip 16, the instant invention generates multiple image lines from multiple slits 28. Thereby the total amount of light impinging upon the image detector is many times the amount of light available through the use of a single slit. To reduce diffraction effects, these slits 28 are large enough (suitably about 0.3 to 2.0 mm in various widths) and separated by large enough opaque areas (also about 0.3 to 2.0 mm). The photosensitive strip in this case is a row of several thousand CCD pixels. Alternatively, these pixels can be those of a comparable linear CMOS image detector. The large number of pixels allows the complexity and details of the image pattern to be detected. The image is then processed sequentially, pixel by pixel, using a conventional digital signal processor (DSP) to read, identify, and locate the displacement (of the center) of the image pattern in the midst of electronic noise using standard signal processing techniques.

All the slits should have substantially parallel sides. The straighter and more parallel the sides are, the better will be the definition of the pattern 35 and the more accurate will be the resultant determination of the centroid of the point light source. These slits, however, are of irregular width and spacing. The reason for the irregularity is to restrict or prevent ambiguity of the displacement of the pattern when the images from some of the individual slits are missing from one or both ends of the image pattern. In fact, ideally designed irregularity will allow part of the image to extend beyond the end of the photosensitive strip but will still allow the displacement of the image's center to be unambiguously determined. The DSP, using the actual image pattern, the reference image pattern, and conventional correlation calculations, in effect sums the intensities of the multiple images while random errors, due to background noise for example, tend to cancel statistically. In particular, the total image signal amplitude grows faster than the average total noise so that the effective signal-to-noise ratio (SRN) increases with the square root of the total amplitude.

Figure 6A:
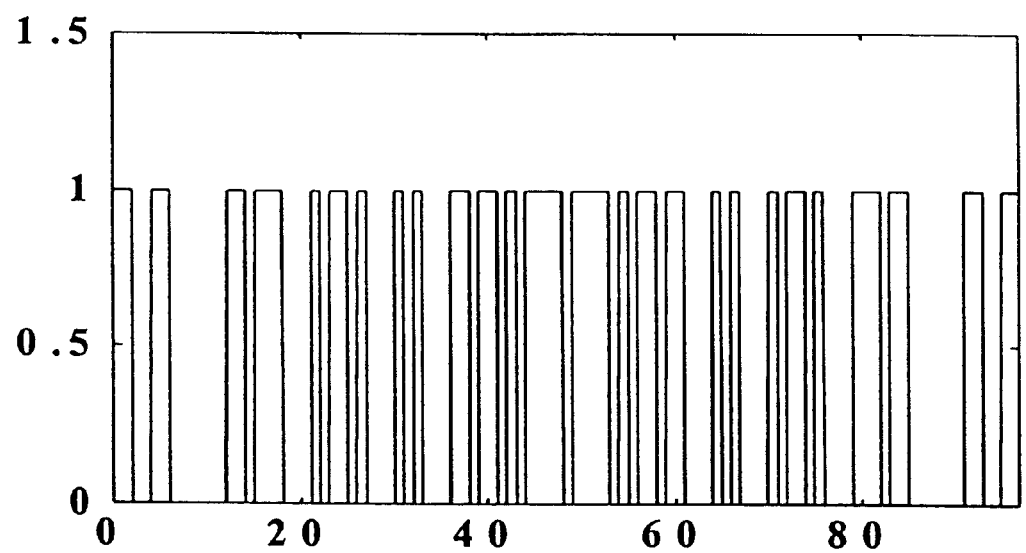
FIG. 6a is a graph of the mathematical representation of a pattern of slits according to this invention.
Figure 6B:
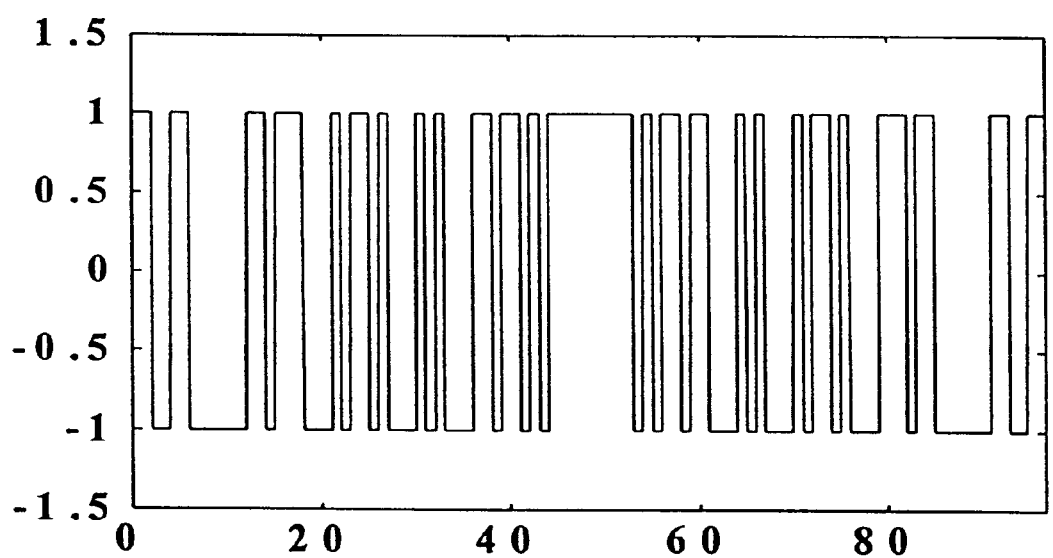
FIG. 6b is a graph of the mathematical representation of the corresponding reference pattern.
Figure 6C:
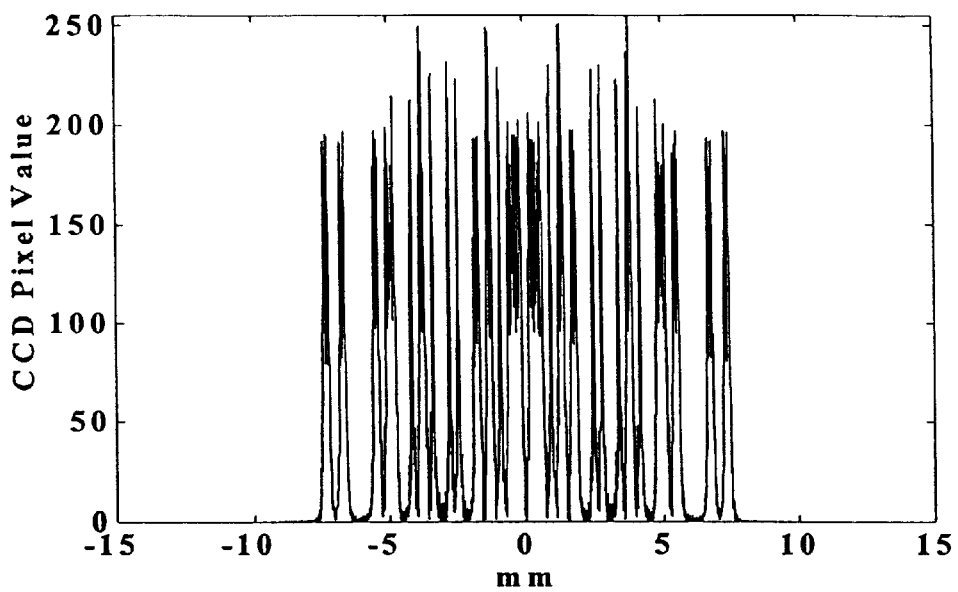
FIG. 6c is an example of a realistic, actual image pattern.
Figure 6D:
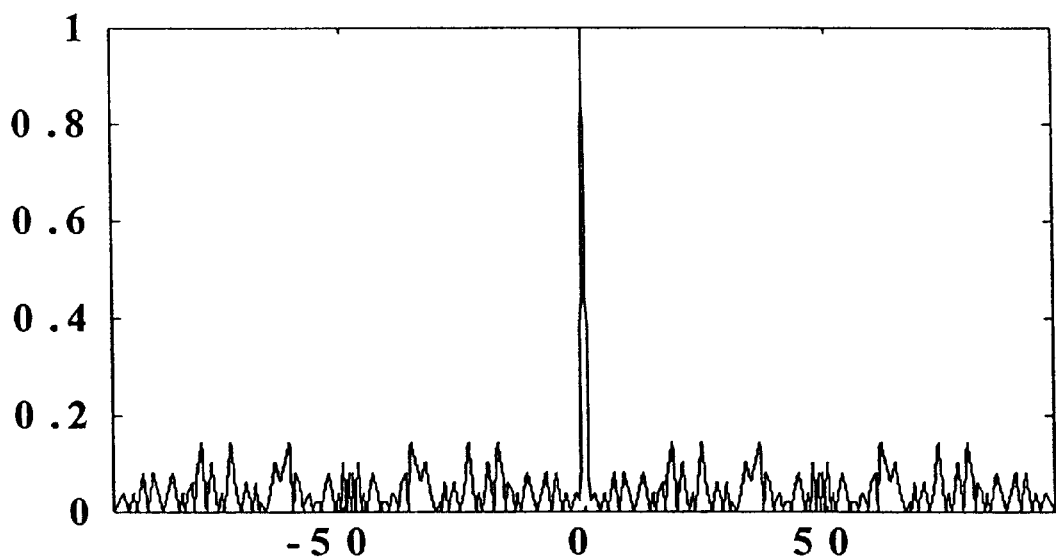
FIG. 6d is a graph of the correlation function as the reference pattern is shifted left or right from the peak displacement.

The brute-force way to determine the location of the image, that is, the displacement of its center relative to the detector, is to correlate the actual image pattern with a reference pattern. The correlation can be performed by incrementally displacing the reference pattern from left to right by each possible pixel displacement until the correlation maximum (best match) is found. The displacement with the best match (the peak of the correlation function) then corresponds to the tangent of the angle which the point source forms with respect to the sensor's normal vector. This is illustrated in FIG. 6d, which plots the correlation between an ideal image pattern and the reference pattern for various displacements of the reference pattern relative to the image pattern. The correlation computation is a very well-established and common technique in digital signal processing and image processing and is described in almost any textbook on the subjects.

Figure 7:
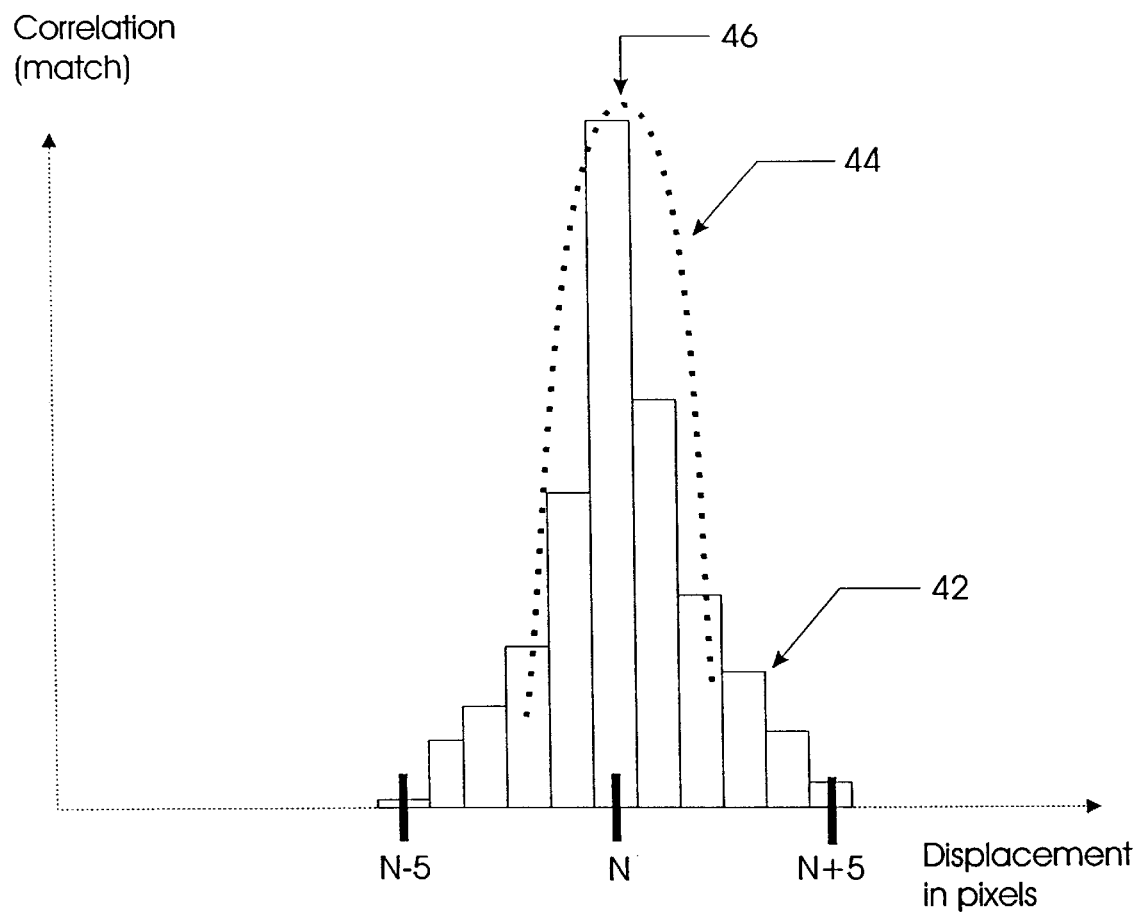
FIG. 7 is a graphical presentation of data that show a typical correlation function and a continuous best-fit quadratic function.
Figure 8A:
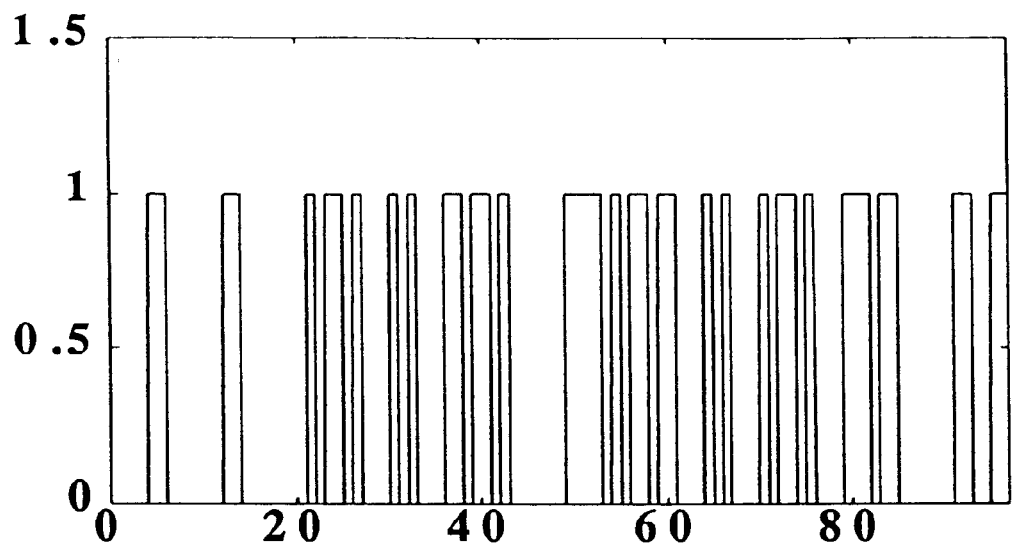
FIG. 8a is a graph corresponding to the graph of FIG. 6a, but with missing apertures.
Figure 8B:
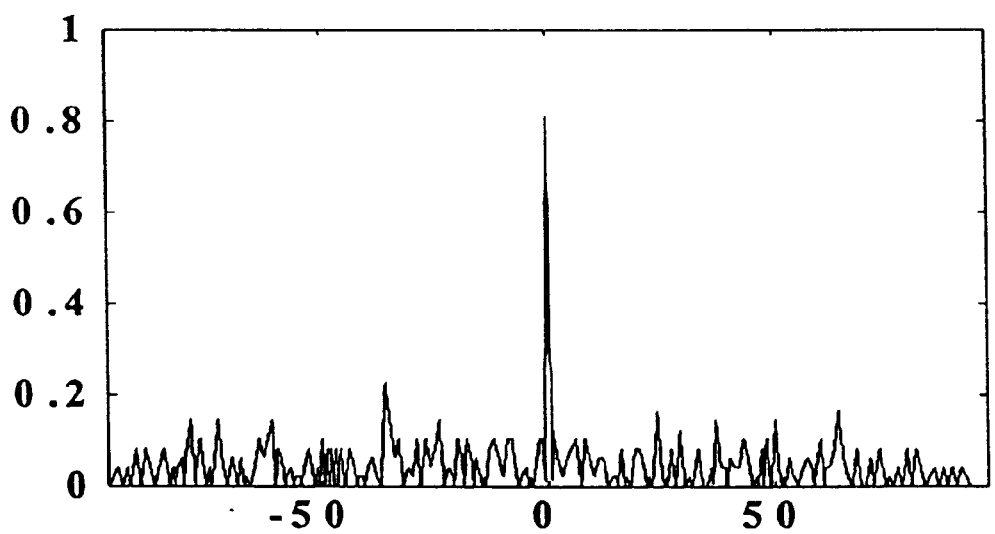
FIG. 8b is a graph corresponding to the graph of FIG. 6d showing the correlation of the image pattern of FIG. 8a with the reference pattern of FIG. 6b.

The correlation function provides values only at discrete, whole-pixel displacements. See FIGS. 6d and 7 for examples of the plot of such discrete correlation calculations. In FIG. 7 the stair-step graph 42 of the correlation function shows the effect of displacing the reference pattern by different amounts as measured in whole pixels. For example, with the reference pattern shifted by N pixels, the correlation function yields the highest value. A shift of N+1 pixels yields a lesser value. The precise actual displacement of the image pattern, as measured to a fractional pixel (sub-pixel), can be estimated by using well-known best-fit polynomial interpolation techniques. This can be done by using the pixel displacement with the maximum correlation value and by using several of its immediately neighboring correlation values on each side. The dotted line 44 shows how the peak 46 of a best-fit continuous quadratic polynomial might be used to interpolate the exact displacement of the image in terms of fractions of a pixel (for example, N+0.41 in FIG. 7). Other techniques may be used to interpolate the actual displacement, such as computing the centroid of the graph 42.

The interpolated displacement of the center of the image, in effect, uniquely determines a plane which contains the point source of light 10, the centerline of the aperture pattern 25 and parallel to the apertures 28, and the center of the image pattern 35. The location of the point radiation source is the intersection point in 3-D space of all the planes from all the multiple sensors. If there are more than three planes (that is, more than three sensors), the invention would use a "best-fit" method to determine that point (such as the common method of finding the point which minimizes the sum of the squares of its distances to all the planes). This is because the measurement will have some small error, and further because the point source of the radiation is really not a point source in the strictest sense of the term. Rather it is a close approximation of a point radiation source and therefore the multiple planes computed from the multiple sensor displacements may not intersect in exactly one point in space. Given enough sensors at appropriate known locations and orientations, the coordinates of this point in some fixed coordinate system are unique and may be computed. The mathematical details for one way to perform this calculation are presented in the Burton and Sutherland paper cited previously.

In practice a digital signal processor (DSP) associated with each image detector would compute the correlation function to determine the exact image displacement. Then a standard floating point microprocessor, such as an Intel Pentium processor, would compute the XYZ coordinates of the location of the point source in the 3-D spatial coordinate system. The latter processor would be provided with the interpolated digital image displacement value from each sensor's DSP as well as calibration information such as the locations and orientations of the sensors While almost any random irregular pattern of slits would be adequately effective in the practice of this invention, some patterns have better correlation characteristics than others. Ideally, the correlation computation will return a zero value for all displacements of the reference image except those near the correct displacement. See FIG. 6d as an example. Near the correct displacement (say at pixel N), the correlation value should increase sharply to a peak 46, but not too sharply, since it is desirable to use some interpolation function in order to estimate the sub-pixel location of the peak 46 as shown in FIG. 7. The least-squares best-fit quadratic would be such an interpolation function.

Figure 5:
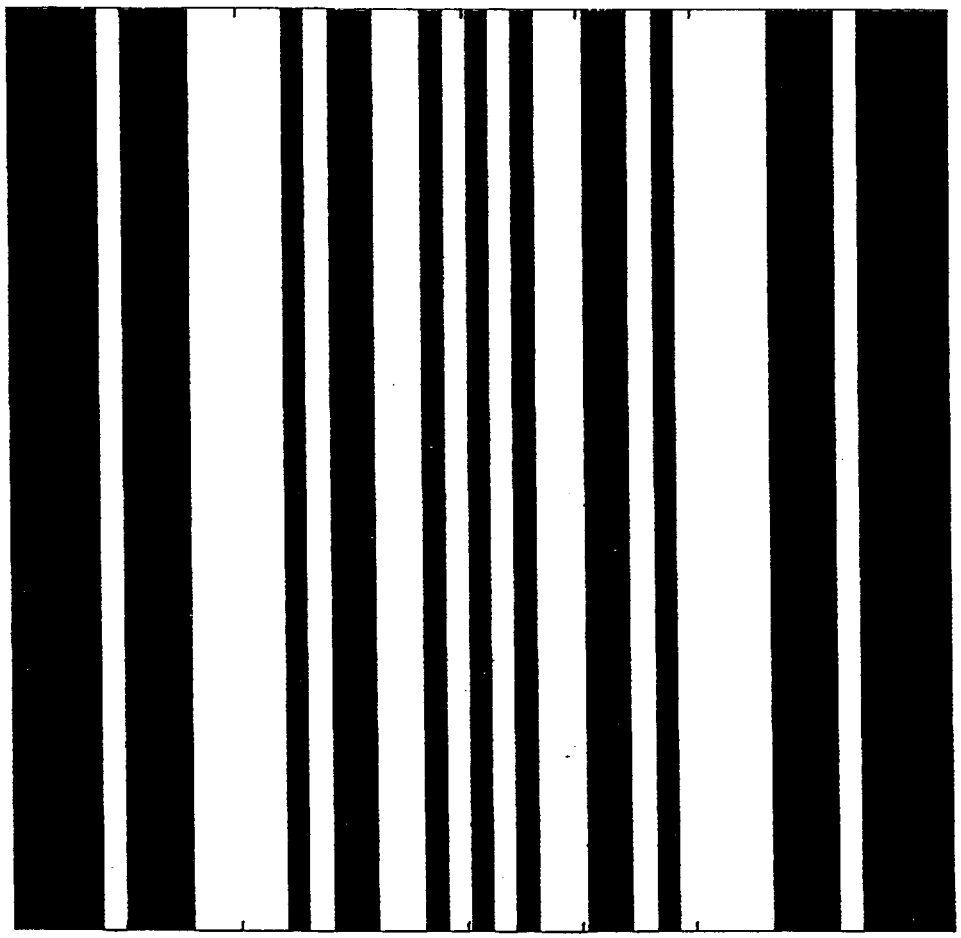
FIG. 5 is a pattern of slits according to this invention.

The pattern need not consist simply of transparent apertures in an opaque mask as shown in FIG. 3 through FIG. 5. Alternatively, it could consist of a pattern of strips of varying transparencies or even a wave-like pattern of a continuously varying transparency. Such continuously varying patterns will render better interpolation if the pixel size approaches or exceeds the size of the aperture or strip width. This is not the case for the preferred embodiment described herein, where each slit or intervening opaque area casts an image many pixels wide. High contrast patterns are easier to generate and less costly to manufacture in quantity with good precision and quantity.

As noted above, the field of x-ray imaging uses a related concept of a pattern of multiple pinhole apertures to increase total film exposure while maintaining sharp images. Such coded apertures traditionally use irregular 2-dimensional patterns of round or rectangular holes. The resulting overlapping images are used for the purpose of creating complete images of complex x-ray illuminated objects rather than for the purpose of precise, sub-pixel displacement measurement to localize a point source of radiation.

A uniformly redundant aperture (URA) pattern is a specific kind of coded aperture which possesses the desired characteristics described previously. Furthermore, it has an average density of about 50%, so it will pass much light to the detector. Therefore, the preferred embodiment of the present invention employs an URA-type pattern, but in only one (1) dimension. An example of a uniformly redundant aperture pattern for our 1-dimensional purposes is shown in FIG. 5.

A URA pattern (for the instant 1-dimensional purpose) is based on some minimal unit slit width W (such as 0.3 mm, for example), and the whole pattern is P·W mm wide where P is a prime number. Each slit width and each opaque separation between two slits is some multiple of W. If P unit-wide contiguous rectangular strips are numbered from $-(P-1)/2$ on one end, through 0 in the middle, and up to $(P-1)/2$ at the other end, then strip S is transparent if and only if $I^2 = S$ modulo P, for some integer I.

Therefore, $(P+1)/2$ strips are transparent, and the rest are opaque. If $P=4*I+1$ for some integer I, then the pattern is symmetrical. Otherwise the pattern is anti-symmetrical. That is, each transparent strip on one side of the centerline is mirrored by an opaque strip on the other side of the centerline. Groups of contiguous transparent strips form composite apertures of various widths. Groups of contiguous opaque strips produce varying separations between the apertures. The best choice of P and the choice of the exact width of the strips depends on the length of the detector, the number of pixels, the desired field of view, the distance between the aperture mask and the detector, and diffraction limitations for the chosen wavelength of light. For example, if the detector has 4096 pixels each of which is 8 microns square (totaling 33.77 mm long) and it is desired that the image pattern cover about ¼ of the detector (or 1024 pixels), then the aperture pattern should be 8 mm wide. For P=23, the strips should be about 0.348 mm wide. For P=17, the strips should be about 0.471 mm wide. For purposes of this invention, a symmetrical pattern is preferred because it is more likely to produce consistent accuracy under varying conditions. This is because there is no possibility of introducing a bias toward one side or the other in the presence of diffraction artifacts.

When computing the correlation function as shown in FIG. 6d, thousands of multiplications and additions must be done for each of thousands of discrete displacements of the reference pattern. This results in a total of millions of arithmetic operations. Therefore, some optimized algorithm or short cut is desirable. One preferred optimization is to perform a fast Fourier transform (FFT) on the actual image and an FFT on the reference pattern. The latter FFT need only be computed one time, since the reference pattern is constant. After multiplying the two FFTs element by element, the inverse FFT of the product is computed, the pixel displacement with the peak value is found, and finally the results are interpolated using several nearby values. This computation will take only tens of thousands of arithmetic operations:

$C = FFT^{-1}(FFT(D) * FFT(E))$ where

C is the correlation value at each integral pixel displacement,

D is image pixel amplitudes on the detector,

E is +1 for an aperture in the reference pattern and −1 elsewhere, and

* is element-by-element complex multiplication

In the case where the actual image pattern is known to be whole, its approximate displacement could be estimated from the pixel locations of its extremities or from its centroid. Then, instead of the FFT computation above, the correlation function could be computed directly at only about a dozen displacements and the interpolation computed from those few correlation values. In this case, the image displacement could be evaluated in a time interval that is equal to or less than that needed for the FFT approach.

Figure 9:
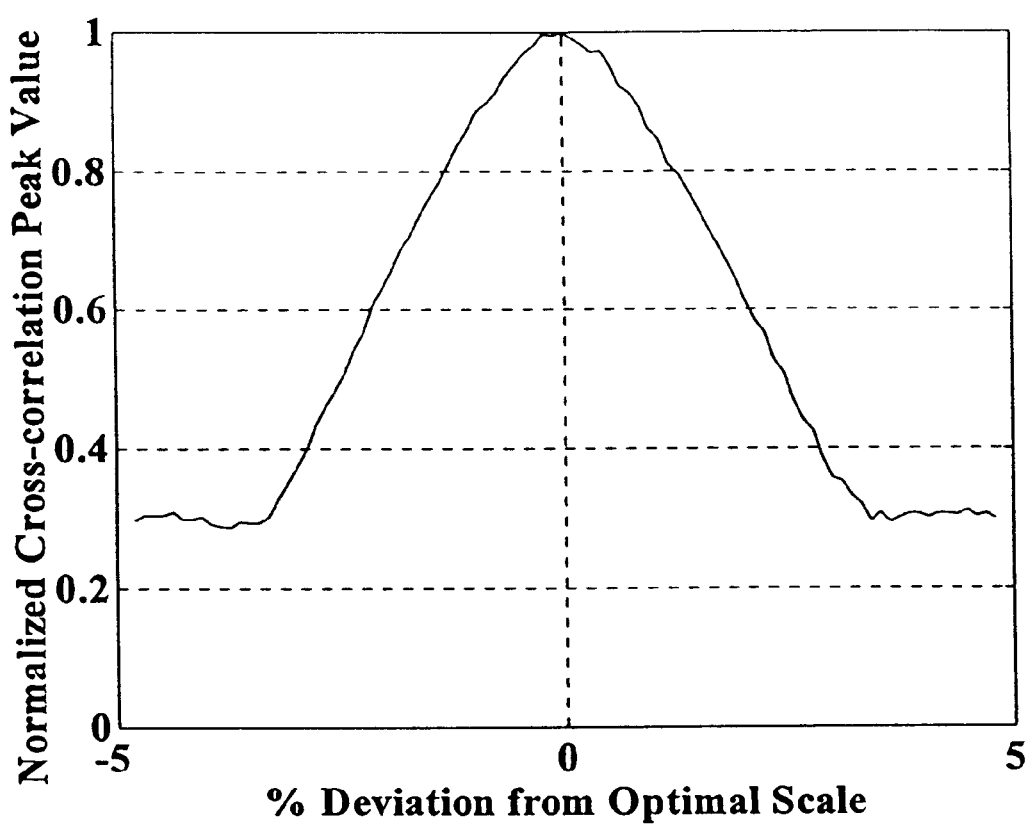
FIG. 9 is a graph showing the height of the peak of the correlation function as the magnification (scale) of the image pattern changes.
Figure 10:
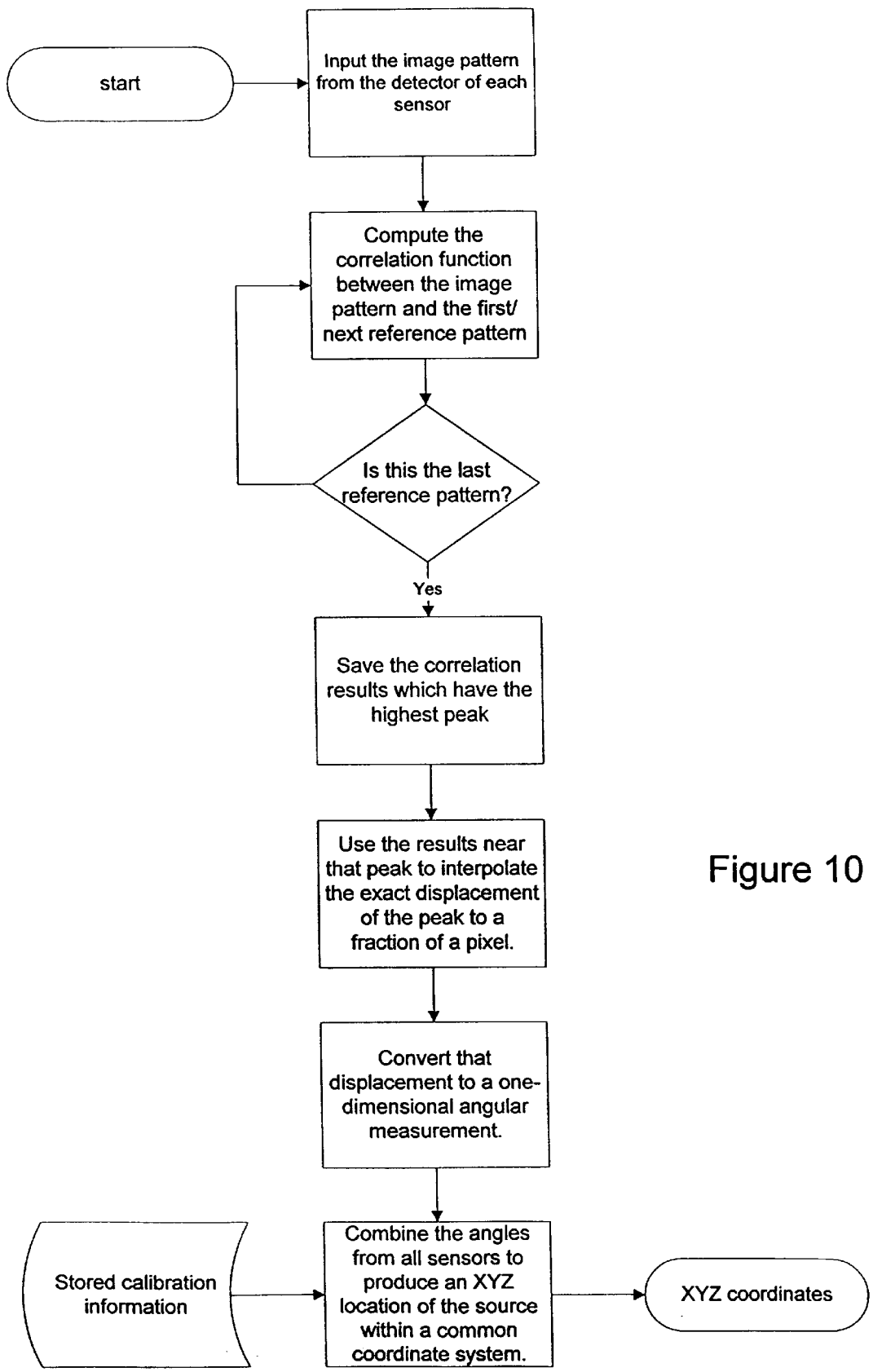
FIG. 10 is a flowchart of the calculations associated with this invention.

Normally it is assumed that the distance from the point radiation source to the mask is many times the separation distance between the mask and the detector. As the point radiation source comes closer to the aperture mask, the image pattern on the detector grows somewhat in size. This must be accounted for, because a growth of just a few percent in the image significantly degrades the height and width of the peak in the correlation function. This is depicted in the graph of FIG. 9 for the case of a 15 mm wide URA with P=97. One solution to this problem is to scale down artificially the size of the image to a fixed size, such a size which is the same as the width of the aperture mask itself. An elementary way of doing this is simply to delete M equally separated pixels from the image, where M is the difference in sizes of the actual image and of the aperture mask (as measured in pixels), until the total remaining image is of the correct size. A more precise solution is to perform correlation calculations with reference patterns of several sizes and then use the resulting correlation function with the highest peak (that is, the best match). Note that this would yield an estimation of the distance of the point source from the sensor. That estimate could be used to verify the final calculation of the location of the point source.

Another possible solution to the problem of a magnified image is to recompute (the FFT of) the description of the reference pattern dynamically, based on the width of the whole image pattern. This however assumes that the whole image is present so that its width can be determined directly. If the whole image is not present, the reference pattern width P*W could be determined by estimating the width W of the unit strip from the slit images which are visible. Clearly, other variations of these optimized methods are possible and are within the scope of this invention.

Two-dimensional aperture arrays and area image detectors could also use the methods described above. For example, the referenced paper by E. E. Fenimore applies 2-D coded apertures to 2-D imaging such as with x-rays. However, the computational cost of doing the general 2-D correlation computation (with or without FFTs) prohibits 2-D displacement calculation in real-time with current technology, since there are at least 250 thousand pixels on a typical two-dimensional area CCD. Thus there are substantially more pixels to be processed and there are substantially more displacements of the reference image at which to compute the correlation. Of course, given an estimate of the 2-D displacement of the image on the detector, one can use short cuts as in the 1-D case to drastically reduce the computation time. In the 2-D detector case, the need for this kind of alternative optics is not as important, because standard 2-D spherical lens systems are more practical in that case. Standard lens systems are less problematic, are readily available in large varieties, and are more highly developed than cylindrical lenses.

Although this invention has been described above with reference to a preferred embodiment, anyone skilled in the art can readily visualize alternative embodiments of this invention. Therefore, the scope and content of this invention are not limited by the foregoing description. Rather, the scope and content are to be defined by the following claims:

What is claimed is:

1. In an apparatus for determining a location of at least one substantially point-like radiator of energy in a three dimensional volume comprising:

said at least one substantially point-like radiator of energy;

at least one detector adapted to be disposed in a known location within said three dimensional volume, and adapted to be positioned to intercept energy radiating from said substantially point-like radiator, wherein said detector comprises at least one array of elements adapted to detect said radiation and to convert said detected radiation into output signals; and at least one pattern member, adapted to be disposed between said array and said radiator, comprising plural gradations of transparency, wherein said pattern is adapted to spatially modulate radiation that is incident thereon as a function of said gradations in transparency, and to project said modulated energy onto said array in the form of at least one real image; and a signal processor adapted to convert output signals representative of said at least one modulated real image into a direction of said radiator relative to an assembly of said detector and said pattern member;

the improvement that comprises:

at least one substantially ideal reference image of said pattern member on said array;

said signal processor being adapted to compare said modulated image with said reference image;

said signal processor comprising a discrete mathematical correlation function that is adapted to characterize the degree of match between said modulated image and said reference image for a plurality of discrete displacements of said reference image with respect to said array, said signal processor being adapted to identify at least one of said displacements that produces a correlation that is characterized by a well defined maximum value; and said signal processor being adapted to convert said displacement(s) producing a maximum value into a direction of said radiator in said three dimensional volume with respect to the known location of said detector in said three dimensional volume.

2. The improved apparatus of claim 1 further comprising said signal processor being adapted to estimate the displacement of the maximum value of a continuous function, that equals the correlation function at said displacements interpolated between at least two discrete displacements of said correlation function; and said signal processor being adapted to convert said estimate into an interpolated, and therefore more precise, direction of said radiator in said three dimensional volume.

3. The improved apparatus of claim 1 wherein said plural gradations of transparency comprise a plurality of slits of varying width in an otherwise substantially opaque field.

4. The improved apparatus of claim 3 wherein said array is substantially one dimensional and comprises a linear strip of said radiation converters, wherein long dimensions of said slits are substantially normal to said linear strip.

5. The improved apparatus of claim 4 comprising a plurality of said arrays at least two of which are disposed substantially normal to each other; and said signal processor is adapted to determine directions of said radiator with respect to said arrays in at least two dimensions corresponding to the dispositions of said normal arrays.

6. The improved apparatus of claim 4 comprising a plurality of said arrays at least three of which are disposed not all parallel to each other and said signal processor is adapted to determine directions of said radiator with respect to said arrays in at least three dimensions corresponding to the dispositions of said arrays whereby enabling said signal processor to determine the substantial point location of said radiator in said three dimensional volume.

7. The improved apparatus of claim 3 wherein the width of said slits are not digitally related to each other.

8. The improved apparatus of claim 3 wherein the widths of said slits correspond to a uniformly redundant array (URA) pattern.

9. The improved apparatus of claim 3 wherein said slits are of random width or random spacing.

10. The improved apparatus of claim 3 wherein said slits are disposed symmetrically about an arbitrary line that is contained in said real image and is transverse to said array.

11. The improved apparatus of claim 1 wherein said radiation is electromagnetic radiation.

12. The improved apparatus of claim 11 wherein said radiation is infra red.

13. The improved apparatus of claim 1 wherein said array comprises a plurality of photodetector elements.

14. The improved apparatus of claim 13 wherein at least some of said elements are linearly aligned.

15. The improved apparatus of claim 14 wherein said array comprises a charge coupled device (CCD).

16. The improved apparatus of claim 15 wherein said CCD comprises at least one linear row of photosensitive pixels.

17. In a method of determining the direction of at least one unknown point in a three dimensional volume, relative to a different, known location in said volume, which comprises:

disposing at least one substantially point source energy radiator in said three dimensional volume in known spatial relationship to at least one of said point(s);

disposing at least one detector, that is adapted to detect energy radiated by said radiator and impinged upon at least one linear array of elements that are adapted to detect said radiation and to convert detected radiation into output signals that are proportional to strength of said impinged energy on the elements of said array, wherein said detector is in known spatial relationship to said three dimensional volume;

operatively associating said detector(s) with a signal processor that is adapted to convert said output signals to a direction of incidence of said radiation on said detector(s);

the improvement that comprises:

interposing a pattern member, comprising plural areas having gradations of transparency to said radiation, between said radiator and said array;

radiating energy from said radiator to said array through said pattern member such that a modulated image of said pattern member is disposed on said array;

generating an output of said array that is representative of at least one displacement of a substantially ideal reference image of said pattern member;

in said signal processor, comparing said modulated image with at least one of said displaced reference images until a best match is found between a specific displaced reference image and said modulated image; and in said signal processor, from said best match, determining a direction of said radiator with respect to said detector.

18. An improved method as claimed in claim 17 further comprising repeating said direction determination with said detectors at different spatial relationships to said volume, sufficient to establish the three dimensional coordinates of said unknown point.

19. An improved method as claimed in claim 18 wherein said array is a plurality of linear aligned plural elements that are adapted to convert impinged energy into output signals and further comprising repeating said improved method with at least three arrays disposed not all parallel to each other.

20. An improved method as claimed on claim 18 wherein said plural gradations of transparency comprise a plurality of slits of differing, non-digital widths that are longitudinally disposed normal to said array; and further comprising causing said modulated image to comprise a set of lines transverse to said array.

* * * * *